United States Patent Office 2,926,144
Patented Feb. 23, 1960

2,926,144

CATALYST FOR DECOMPOSITION OF HYDRAZINE

Otto J. Plescia, Madison, Wis., and Russell M. Mantell, Newark, N.J., assignors to The M. W. Kellogg Company, Jersey City, N.J., a corporation of Delaware No Drawing. Original application February 12, 1949, Serial No. 76,185. Divided and this application October 18, 1950, Serial No. 190,868

14 Claims. (Cl. 252—474)

This invention relates to the decomposition of hydrazine and a catalyst therefor. In one aspect, the invention relates to a method for the catalytic decomposition of hydrazine as a gas generant. More specifically in this aspect, the invention relates to an improved method for the catalytic decomposition of hydrazine as a gas generant, employing a novel catalyst and the method for its preparation. This application is a division of our prior and copending application Serial No. 76,185, filed February 12, 1949, relating to the decomposition of hydrazine.

The use of hydrazine as a gas generant for supersonic vehicles, guided missiles, rockets and the like, has been found highly preferable over that of hydrogen peroxide, which has heretofore been catalytically decomposed for such purposes. In this respect, the use of hydrazine as a gas generant is particularly attractive by reason of its significantly greater performance efficiency and its greater stability, which eliminates storage and transportation difficulties which are normally encountered in the handling of hydrogen peroxide as a gas generant.

It is, therefore, an object of the present invention to provide for an improved process for the decomposition of hydrazine.

Another object of the invention is to provide for an improved process for the catalytic decomposition of hydrazine as a gas generant.

A further object of the invention is to provide a highly suitable and efficient catalyst for the decomposition of hydrazine.

Still another object of the invention is to provide a method for the preparation of a novel catalyst suitable for the decomposition of hydrazine.

Further objects and advantages inherent in the invention will be apparent to those skilled in the art from the following more detailed disclosure.

According to the invention, a highly satisfactory and improved catalyst for the decomposition of hydrazine is prepared from cobalt, copper and an alkali metal. In one embodiment of the invention, elementary cobalt, copper and an alkali metal, or an oxygen-containing compound of each of these metals, or combinations of any one or two of these metals with oxygen-containing compounds of any one or two of the remaining metals, as more fully hereinafter described, are formed into a mixture in proportions such that these components on the metal weight basis consist of approximately 30 to 80% cobalt, 10 to 45% copper and 10 to 45% of the alkali metal, and the material thus formed is employed as the catalyst in effecting hydrazine decomposition, as more fully hereinafter described. In another embodiment of the invention, water is added to the above-mentioned mixed material (especially in instances where the alkali metal is present in the form of its oxygen-containing compounds) in an amount sufficient to form a slurry and the components are again thoroughly mixed. The resulting mass is next dried at a temperature of approximately 100° C. and then heated at a temperature preferably between about 600° C. and about 900° C. and preferably for at least about 30 minutes; or if so desired, the above-mentioned slurry may be heated directly at a temperature within the above-mentioned preferred range, for at least the minimum required time, without the preliminary drying step at 100° C. The resulting heat-treated mass may then be employed as the catalyst for effecting the desired hydrazine decomposition. In still another embodiment of the invention, the above-mentioned heat-treated mass is ground to a granular mass having a particle size which may vary between about $1/16$ inch and about $1/2$ inch in diameter; or the above-mentioned heat-treated mass may be ground to a size not larger than about 20 mesh, and preferably to a size between about 20 and about 100 mesh, and then pelleted, extruded or otherwise shaped (e.g., at a pressure such as 5000 pounds per square inch) to the desired particle size which may vary within the aforementioned range, namely, between about $1/16$ inch and about $1/2$ inch in diameter, or if so desired, a portion of the heat-treated mass may be ground to a granular mass having the aforementioned particle size, and the remaining portion may be ground and pelleted, extruded or otherwise shaped under the conditions indicated above. The thus pelleted or otherwise shaped material may then be employed as the catalyst, or if so desired, may be roasted to a temperature preferably below the point of incipient fusion and preferably activated by reduction with hydrogen, hydrazine or other suitable reduction media, to convert at least a portion thereof to the metallic state.

In preparing the catalyst in accordance with the aforementioned broad embodiments of the process of the invention, the oxygen-containing compounds of one or more of the metallic cobalt, copper and alkali metal components employed within the above-mentioned proportional limitations, may comprise various oxygen-containing inorganic or organic compounds of these metals, such as their oxides, hydroxides, nitrates, nitrites carbonates, bicarbonates, formates, acetates, oxalates and the like, all of which have been found highly effective in bringing about the desired hydrazine decomposition, with a vigorous reaction taking place within a period of about 1 to 3 seconds from initial contact. In this respect, it has been found that the oxides, nitrates and bicarbonates of cobalt, copper and the alkali metals are particularly desirable as the catalyst components, although one or two of the elemental metals may be employed in combination with the aforementioned compounds of the remaining metal components. Hence, one preferred type of catalyst has been found to comprise metallic cobalt and an oxide of each of copper and an alkali metal, or metallic cobalt and copper and an oxide or nitrate of the alkali metal, in the metal weight ratios of approximately 1:0.4:0.4, in each instance.

Another highly active catalyst for effecting rapid hydrazine decomposition, has been found to comprise cobaltic oxide, cupric nitrate, and sodium bicarbonate in a weight ratio of approximately 1:1:1. However, the components comprising this last-mentioned catalyst may be varied without destroying the efficacy of the catalyst, by replacing cobaltic oxide, wholly or in part, with cobalt nitrate or nitrite; replacing cupric nitrate, wholly or in part, with oxides of copper; and replacing sodium bicarbonate, wholly or in part, by sodium carbonate. The alkali metal components, employed either as the elementary metal or as an oxygen-containing compound of the metal, may comprise any of the alkali metals with sodium, potassium and lithium being generally preferred.

As indicated above, the mixture of the components comprising the catalyst mass may be heated at a temperature preferably between about 600° C. and about 900° C. preferably for at least about 30 minutes, and if so desired, subsequently ground and/or pelleted as previously described. However, in some instances it may be desirable, depending upon the nature of the catalytic components, to effect the above-mentioned grinding and pelleting prior to heat-treatment. In such event, it is preferred to heat the pelleted particles at a temperature just below the point of incipient fusion. Whereas, in instances where the heat-treatment precedes the conversion of the catalyst to a granular mass, the temperature at which the heat-treatment is to be carried out has been found not to be critical and may be brought to as high as 900° C. or even higher to the point of incandescence.

In order to ascertain the efficacy of the aforementioned catalysts, laboratory data were obtained employing various catalyst compositions comprising cobalt, copper and alkali metals. These data were based upon a series of three different tests (A, B and C) as shown in the table below, in which hydrazine was contacted with prepared catalyst materials, as indicated in the table, and the reaction noted in each case. These tests were conducted in the manner indicated below for the purpose of subjecting the catalytic material to progressively more severe conditions, from test A to test C, and the respective reactions noted under the different test conditions:

Test A

About 0.1 gm. to 1.0 gm. of the pelleted catalytic material was placed in an open test tube. Hydrazine hydrate, at a temperature of approximately 25° C. and consisting of 66% hydrazine, was slowly added drop-wise and the reaction noted. No external heat was applied.

Test B 1.0 ml. of hydrazine hydrate, at a temperature of approximately 25° C. and consisting of 66% hydrazine, was placed in an open test tube. About 0.1 gm. to 1.0 gm. of the pelleted catalytic material was slowly added and the reaction noted. No external heat was applied.

Test C 10.0 ml. of hydrazine hydrate, at a temperature of approximately 25° C. and consisting of 66% hydrazine, was placed in a 150 ml. open beaker. About 2 gm. of the pelleted catalytic material were quickly added and the reaction noted. No external heat was applied.

The results obtained, employing the above-mentioned tests, are recorded in the following table in which all the reactions took place within a period of from 1 to 3 seconds from initial contact.

| Catalyst No. | Composition on Percent Metal Basis | Reaction— Tests A, B and C |
| --- | --- | --- |
| 1 [1] | 57Co:21Cu:22Na | High vigorous. |
| 2 [1] | 40Co:45Cu:15Na | Do. |
| 3 [1] | 80Co:10Cu:10Na | Do. |
| 4 [1] | 39Co:16Cu:45Na | Do. |
| 5 [2] | 40Co:29Cu:31K | Do. |
| 6 [2] | 50Co:37Cu:13Li | Do. |
| 7 [2] | 44Co:33Cu:17K:6Li | Do. |
| 8 [3] | 69Co:24Cu:7Na | None. |
| 9 [3] | 67Co:24Cu:9K | Do. |
| 10 [3] | 72Co:25Cu:3Li | Do. |
| 11 [3] | 67Co:24Cu:9Li | Do. |
| 12 [3] | 65Co:23Cu:9K:3Li | Do. |

[1] Prepared by ignition of mixtures of $Co_2O_3$, $Cu(NO_3)_2 \cdot 3H_2O$, and $NaHCO_3$; and glowed at a dull red heat for 30 minutes.
[2] Prepared by ignition of mixtures of $Co_2O_3$, $Cu(NO_3)_2 \cdot 3H_2O$, and either $K_2CO_3$ or $Li_2CO_3$; and glowed at a dull red heat for 30 minutes.
[3] Prepared by pelleting mixtures of Co and Cu powders with the appropriate alkali carbonates.

It will be apparent from the table that quick decomposition of hydrazine occurs where the catalyst components are formed into mixtures in proportions such that these components on the metal weight basis consist of approximately 30 to 80% cobalt, 10 to 45% copper and 10 to 45% of the alkali metal. This is evidenced by the highly vigorous reaction taking place when conducting the tests employing catalysts 1 through 7. On the other hand, when employing catalysts whose compositions fall outside the aforementioned proportional limitations, little or no reaction is observed. Thus catalysts 8 through 12 exhibited no perceptible decomposition of hydrazine under the respective tests, by reason of the abnormally low proportion of alkali metal content present.

As previously indicated, one preferred highly active catalyst for effecting rapid hydrazine decomposition has been found to comprise cobaltic oxide, cupric nitrate and sodium bicarbonate in a weight ratio of approximately 1 : 1 : 1. This catalyst may be prepared by first thoroughly mixing equal parts by weight of the above-mentioned three components. To the mixture is added a quantity of water equal to by weight from ⅓ to ⅙ that of the aforementioned mixture, and the mass is again thoroughly mixed. This mass is then dried at approximately 100° C. in order to drive off water present, and is subsequently heated to a temperature between about 700° C. and about 760° C. for a period from about 1½ to 2 hours. The resulting mass is then ground to a 20–100 mesh, and is pelleted at approximately 5000 pounds per square inch pressure. The pellets are then activated by reduction with hydrazine, hydrogen, or other suitable reducing media and then ready for use. It will be understood, however, that the roasting and activation procedure may vary considerably depending upon the use of the catalyst.

In carrying out the hydrazine decompositions employing any of the catalysts indicated above, it is preferred to employ the catalyst material in a fixed-bed state, with hydrazine being introduced into the reaction zone preferably in the form of a spray through one or more injection spray-nozzles inserted at one or more points in the reaction chamber. It will be, of course, understood that the method of effecting contact between hydrazine and the catalytic material is not critical and that methods other than spray-injection, which will readily suggest themselves to one skilled in the art, may also be effectively utilized. In this respect, it will also be noted that the temperature at which decomposition can be made to take place is not critical, provided, that the hydrazine at the time of contact with the catalyst is maintained in a fluid state. This hydrazine, either as a gas or liquid, may be effectively introduced into the reaction zone without noticeably effecting the ease with which decomposition takes place. It will also be noted that the aforementioned decompositions may take place not only with pure hydrazine alone but also with mixtures of hydrazine and water or other suitable diluents.

In effecting the aforementioned catalytic decomposition of hydrazine, it was found that the decomposition was substantially complete. It should be noted, however, that the decomposition products are not necessarily the elements nitrogen and hydrogen alone. Rather, the decomposition of hydrazine, depending upon the conditions under which the reaction takes place, may result in a mixture of ammonia, hydrogen and nitrogen, in which the decomposition reactions may be represented as follows:

(1) $$3N_2H_4 \rightarrow 4NH_3 + N_2$$
(2) $$2NH_3 \rightarrow N_2 + 3H_2$$

Having thus described our invention, we claim:

1. A catalyst active for the decomposition of hydrazine consisting essentially of cobalt, copper and an alkali metal in proportions such that these components of the catalyst on the metal weight basis consist of approximately 30–80% cobalt, 10–45% copper and 10–45% alkali metal.

2. A catalyst active for the decomposition of hydrazine consisting essentially of an oxide of each of cobalt, copper and an alkali metal in a weight ratio of approximately 1:0.4:0.4.

3. A catalyst active for the decomposition of hydrazine consisting essentially of cobaltic oxide, cupric nitrate and sodium bicarbonate in a weight ratio of approximately 1:1:1.

4. A catalyst active for the decomposition of hydrazine consisting essentially of an oxygen-containing compound of each of cobalt, copper and sodium in proportions such that these components of the catalyst on the metal weight basis consist of approximately 57% cobalt, 21% copper and 22% sodium.

5. A catalyst active for the decomposition of hydrazine consisting essentially of an oxygen-containing compound of each of cobalt, copper and sodium in proportions such that these components of the catalyst on the metal weight basis consist of approximately 40% cobalt, 45% copper and 15% sodium.

6. A catalyst active for the decomposition of hydrazine consisting essentially of an oxygen-containing compound of each of cobalt, copper and potassium in proportions such that these components of the catalyst on the metal weight basis consist of approximately 40% cobalt, 29% copper and 31% potassium.

7. A catalyst active for the decomposition of hydrazine consisting essentially of an oxygen-containing compound of each of cobalt, copper and lithium in proportions such that these components of the catalyst on the metal weight basis consist of approximately 50% cobalt, 37% copper and 13% lithium.

8. A catalyst active for the decomposition of hydrazine consisting essentially of an oxygen-containing compound of each of cobalt, copper, potassium and lithium in proportions such that these components of the catalyst on the metal weight basis consist of approximately 44% cobalt, 33% copper, 17% potassium and 6% lithium.

9. A method for the preparation of a catalyst active for the decomposition of hydrazine which comprises forming a mixture consisting essentially of an oxygen-containing compound of each of cobalt, copper and an alkali metal in proportions such that these components of the catalyst on the metal weight basis consist of approximately 30–80% cobalt, 10–45% copper, and 10–45% alkali metal, mixing said compounds with water to form a slurry, and heating the resulting mass at a temperature between about 600° C. and about 900° C. for at least about 30 minutes.

10. A method for the preparation of a catalyst active for the decomposition of hydrazine which comprises forming a mixture consisting essentially of an oxygen-containing compound of each of cobalt, copper and an alkali metal in proportions such that these components of the catalyst on the metal weight basis consist of approximately 30–80% cobalt, 10–45% copper, and 10–45% alkali metal, mixing said compounds with water to form a slurry, heating the resulting mass at a temperature between about 600° C. and about 900° C. for at least about 30 minutes, and converting the heat-treated mass to a granular mass having a particle size between about 1/16 inch and about 1/2 inch in diameter.

11. A method for the preparation of a catalyst active for the decomposition of hydrazine which comprises forming a mixture consisting essentially of cobaltic oxide, cupric nitrate and sodium bicarbonate in a weight ratio of approximately 1:1:1, mixing said compounds with water to form a slurry, heating the resulting mass at a temperature between about 700° C. and about 760° C. for at least about 30 minutes, converting the heat-treated mass to a granular mass having a particle size between about 1/16 inch and about 1/2 inch in diameter, and subjecting the granular particles to reduction treatment to convert at least a portion thereof to the metallic state.

12. A catalyst active for the decomposition of hydrazine consisting essentially of a component selected from the group consisting of cobalt and an oxygen-containing-compound of cobalt, a component selected from the group consisting of copper and an oxygen-containing compound of copper, and a component selected from the group consisting of an alkali metal and an oxygen-containing compound of an alkali metal in proportions such that these components of the catalyst on the metal weight basis consist of approximately 30–80% cobalt, 10–45% copper and 10–45% alkali metal.

13. A catalyst active for the decomposition of hydrazine consisting essentially of an oxygen-containing compound of each of cobalt, copper and an alkali metal in proportions such that these components of the catalyst on the metal weight basis consist of approximately 30–80% cobalt, 10–45% copper and 10–45% alkali metal.

14. A method for the preparation of a catalyst active for the decomposition of hydrazine which comprises forming a mixture consisting essentially of a component selected from the group consisting of cobalt and an oxygen-containing compound of cobalt, a component selected from the group consisting of copper and an oxygen-containing compound of copper, and a component selected from the group consisting of an alkali metal and an oxygen-containing compound of an alkali metal in proportions such that these components of the catalyst on the metal weight basis consist of approximately 30–80% cobalt, 10–45% copper and 10–45% alkali metal, mixing the mixture thus formed with water to form a slurry, and heating the resulting mass at a temperature between about 600° C. and about 900° C. for at least about 30 minutes.

References Cited in the file of this patent

UNITED STATES PATENTS 2,461,147  Davies et al. _____ Feb. 8, 1949